Jan. 4, 1927.
W. U. ARTHUR
SEED SEPARATOR
Filed Sept. 3, 1925
1,613,553
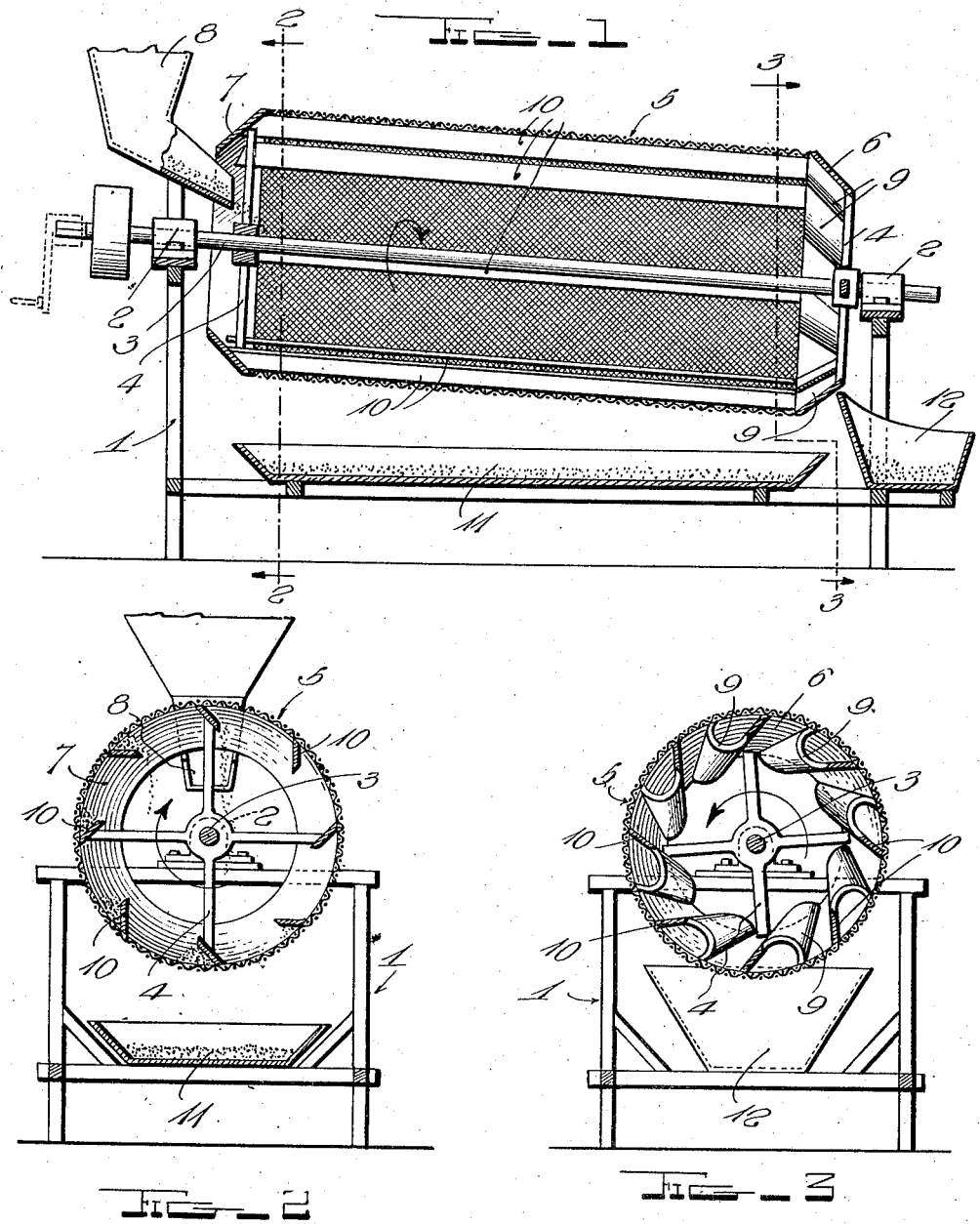
Inventor
Willis U. Arthur, Patented Jan. 4, 1927.

1,613,553

UNITED STATES PATENT OFFICE.

WILLIS U. ARTHUR, OF AIKEN, SOUTH CAROLINA.

SEED SEPARATOR.

Application filed September 3, 1925. Serial No. 54,346.

The invention is a new and improved type of separator which is designed primarily for separating the inferior, black, cotton seed, from the good seed, so that the latter may be used for planting, and the gist of the invention resides in the provision of discharge spouts for the good seed, constructed and arranged in a novel manner with respect to the cylindrical screen of the device and certain longitudinal seed lifting and dumping members which are carried by the screen.

The object of the invention is to provide a separator of the class set forth which will be rather simple and inexpensive, yet will be very efficient and desirable.

With the foregoing in view, the form of construction herein disclosed, has been produced as the preferred formation, although it is to be understood that within the scope of the invention as claimed, variations may be made.

Figure 1 of the accompanying drawing is a vertical longitudinal sectional view through a seed separator constructed in accordance with the invention.

Figures 2 and 3 are vertical transverse sectional views as indicated by lines 2—2 and 3—3 of Fig. 1.

In the drawing above briefly described, the numeral 1 designates an appropriate frame provided with bearings 2 in which a shaft 3 is rotatably mounted, said shaft being connected by appropriate spiders 4 with a cylindrical, inclined screen 5. The discharge end of this screen is provided with a continuous flange 6 which extends inwardly therefrom and throughout its circumference is disposed at an obtuse angle to the continuous wall of the screen. A similar flange 7 is by preference provided at the upper or inlet end of the screen and I have shown a chute 8 discharging into this upper end, with its delivery end surrounded by the flange 7. The two flanges 6 and 7 are preferably of imperforate form and the spiders 4 may well be secured to them.

The inner side of the flange 6 is provided with a plurality of circumferentially spaced, helically pitched, grain discharge spouts 9, each spout being preferably of channel shape with its open side spanned by the flange 6. I also prefer to taper the spouts 9 from their inner toward their outer ends. Grain-lifting and dumping members 10, equal in number to the spouts 9, extend longitudinally along the inner side of the screen 5, said members 10 leading to and discharging into said spouts. Preferably, these members 10 are in the form of slats disposed at acute angles to the screen to provide V-shaped trough-like pockets as clearly shown, the ends of said slats toward the lower or delivery end of the device, being disposed in abutting relation with or secured to the side walls of the spouts 9 which are rearmost, when considered in connection with the direction of rotation of the screen.

Supported by the frame 1 under the screen 5, is a pan or the like 11 adapted to receive the inferior seed which sifts through the screen 5, while the good seed which gradually gravitates to the lower end of the screen, is discharged by the members 10 into the spouts 9 and leaves the latter for reception in an appropriate receptacle 12. Obviously, as the screen is rotated by any preferred means, the grain passing therethrough is continually picked up and dumped by the slats or the like 10, insuring that before the seed reaches the lower end of the screen, all of such seed shall have been subjected to an effective screening action. It is thus insured that all of the small inferior seed shall drop through the screen and shall not be discharged with the good seed into the receptacle 12.

As excellent results are obtainable from the details disclosed, they may well be followed. As above stated however, modifications may be made within the scope of the invention as claimed.

I claim:

1. A grain separator comprising, a rotary perforate cylinder declined toward its discharge end, a set of circumferentially spaced helically pitched discharge spouts at the lower end of the cylinder, and circumferentially spaced individual grain elevators and dumping members extending longitudinally along the inner side of the cylinder and abutting adjacent ends of the spouts to provide direct communication with said spouts, said members being disposed at acute angles to the wall of the screen to form trough-like pockets.

2. A grain separator comprising a cylindrical rotary screen declined toward its discharge end, a centrally disposed shaft extending through said screen, imperforate flanges on each end of the screen and disposed at an obtuse angle to the cylinder wall, spiders connecting said flanges with the shaft, helically pitched, circumferentially spaced grain discharge spouts on the inner side of the flange at the discharge end of the screen and circumferentially spaced slats extending longitudinally along the entire length of the inner side of the screen and at acute angles thereto and connected at one end directly to said spouts, said slats and the adjacent wall of the screen forming V-shaped trough-like pockets for elevating and dumping the grain.

In testimony whereof I have hereunto affixed my signature.

WILLIS U. ARTHUR.